(12) United States Patent
Kawaguchi

(10) Patent No.: US 11,214,294 B2
(45) Date of Patent: Jan. 4, 2022

(54) RETRACTABLE STEERING WHEEL

(71) Applicant: JOYSON SAFETY SYSTEMS ACQUISITION LLC, Auburn Hills, MI (US)

(72) Inventor: Makoto Kawaguchi, Troy, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 16/796,254

(22) Filed: Feb. 20, 2020

(65) Prior Publication Data

US 2020/0269900 A1    Aug. 27, 2020

Related U.S. Application Data

(60) Provisional application No. 62/809,187, filed on Feb. 22, 2019.

(51) Int. Cl.
| | |
|---|---|
| *B62D 1/183* | (2006.01) |
| *B62D 1/10* | (2006.01) |
| *F16C 1/12* | (2006.01) |
| *B62D 1/06* | (2006.01) |

(Continued)

(52) U.S. Cl.
CPC ............ *B62D 1/183* (2013.01); *B62D 1/06* (2013.01); *B62D 1/10* (2013.01); *F16C 1/12* (2013.01); *F16H 19/04* (2013.01); *G05D 1/0061* (2013.01)

(58) Field of Classification Search
CPC ..................................... B62D 1/183
See application file for complete search history.

(56) References Cited

U.S. PATENT DOCUMENTS

| | | | |
|---|---|---|---|
| 7,234,727 B2 | 6/2007 | Mori et al. | |
| 2009/0064815 A1* | 3/2009 | Maeda | B62D 1/183 |
| | | | 74/493 |

(Continued)

FOREIGN PATENT DOCUMENTS

| | | |
|---|---|---|
| JP | 2004338448 A | 12/2004 |
| KR | 10-1856524 B1 | 5/2018 |
| KR | 101856524 B1 * | 5/2018 |

OTHER PUBLICATIONS

Translation of KR101856524.*

(Continued)

*Primary Examiner* — Vicky A Johnson
(74) *Attorney, Agent, or Firm* — Meunier Carlin & Curfman LLC

(57) ABSTRACT

A steering wheel assembly has a central hub configured to connect to a steering column, at least one retractable hand grip attached to the central hub, one or more control cables disposed internal of each retractable hand grip, and a drive mechanism connected to the control cables. The drive mechanism is located either at or in the central hub or remotely relative to the steering wheel assembly. The drive mechanism when activated can selectively move one or more of the control cables to move the retractable grips to a retracted position or a non-retracted position. Optionally, the hand grips can be connected directly to the central hub and/or to one or more spokes extending form the central hub. Each of the retractable hand grips has at least one and up to four control cables.

20 Claims, 20 Drawing Sheets

(51) Int. Cl.
*F16H 19/04* (2006.01)
*G05D 1/00* (2006.01)

(56) References Cited

U.S. PATENT DOCUMENTS

2010/0168962 A1   7/2010  Imamura
2018/0244175 A1*  8/2018  Tan .......................... B60N 2/22

OTHER PUBLICATIONS

International Search Report and Written Opinion relating to International Application No. PCT/US2020/019045, dated Jun. 29, 2020. 11 pages.

* cited by examiner

RETRACTABLE STEERING WHEEL

CROSS REFERENCE TO RELATED APPLICATION

This application claims benefit of U.S. Provisional Application Ser. No. 62/809,187, filed on Feb. 22, 2019, the disclosure of which is incorporated herein by reference in its entirety.

TECHNICAL FIELD

The present disclosure relates to steering wheel assemblies generally, and more particularly to a steering wheel assembly with retractable hand grips.

Steering wheels have been a conventional and almost universally accepted mode of maneuvering a motorized vehicle since the beginning of power-driven vehicles such as automobiles and trucks.

Typically, the steering wheel assembly had a central hub connected to a steering column, a plurality of spokes extending from the hub and a rim or hand grip connected to these spokes. Adjustment of the steering wheel assembly has been limited typically to raising or lowering the entire steering column in a tilting action.

The body structure of the steering wheel has evolved to an underlying armature typically of metal with a space in the center being depressed to form a space to hold a driver's side airbag and a horn switch mechanism. Newer steering wheel assemblies have a number of additional features, such as cruise control switches, radio volume controls, phone activation devices, etc. All these systems enable the driver the opportunity to control these various systems at the steering wheel. As a result, the steering wheel assembly is far more complex than the first early designs.

Typically, the steering wheel has a leather or simulated leather covering. The rim or hand grip is typically a solid ring encased in a soft polyurethane foam and covered with a decorative cover. In some luxury vehicles, the rim is made entirely or partially of highly polished wood or a simulated wood of molded plastic.

The latest evolution of the automobile is the introduction of advanced electric vehicles and with the advances in highly sophisticated computers the movement to self-driving vehicles often referred to as autonomous vehicles.

As these autonomous vehicles become more widely accepted, the vehicle becomes self-steering and self-maneuverable virtually eliminating the need for a driver at a steering wheel. In these cases, the steering wheel is an unnecessary device, but for safety reasons and for those who prefer the option to choose between manual driving or autonomous driving, a steering wheel is essential.

It is this option to drive or not to drive that makes the location or position of a steering wheel a matter of choice. This means the steering wheel assembly may ideally be a device that can be stowed and, when wanted, selected by the driver to be moved to a driving position. To achieve this feature, ideally the design of the steering wheel should be designed to facilitate this.

The present disclosure as described herein provides a number of unique ways to transform the shape and orientation of the steering wheel to enable compact stowing and optimal user vision of the instrument panel in the manual driving and autonomous-driving modes.

SUMMARY

A steering wheel assembly has a central hub configured to connect to a steering column, a plurality of retractable hand grips attached to the central hub, one or more control cables disposed internal of each retractable hand grip, and a drive mechanism connected to the control cables. The drive mechanism is located either at or in the central hub or remotely relative to the steering wheel assembly. The drive mechanism when activated can selectively move one or more of the control cables to move retractable hand grips to a retracted position or a non-retracted position. Optionally, the retractable hand grips can be connected directly to the central hub and/or to one or more spokes extending from the central hub. Each of the retractable hand grips has at least one and up to four control cables. As used herein, the retractable hand grips form all or at least a part of a steering wheel rim. The term "retractable" in this disclosure means movement of one or more hand grips from a non-retracted driving orientation to a retracted non-driving orientation. In some cases, this means the retractable hand grips can telescopically move sliding inside itself or can be pivotally folded about a pivot to a more compact stowed position.

The control cables can be configured as push/pull cables connected to the drive mechanism. The push/pull cables preferably can be flexible geared cables. The drive mechanism can be positioned remotely relative to the steering wheel to save space and provide increased design flexibility.

In one embodiment, the drive mechanism includes a geared linear drive mechanism having a rack gear and pinion gear connected to a drive motor. The linear drive mechanism has the drive motor with an axle holding one or more of the pinion gears. When the drive motor is activated the axle rotates the pinion gear moving the rack gear and the control cable connected to the rack gear to move the retractable hand grips into a non-retracted or a retracted position.

In one embodiment, the drive mechanism has three control cables attached and when the drive motor rotates clockwise, the three cables stroke or otherwise move and pull respective hand grips to a retracted position and when the motor rotates counter clockwise, the cables stroke and push the hand grip to a non-retracted position. The drive mechanism drive motor can have two pinion gears stacked onto an end of the axle. The size of the pinion gear determines the speed of the cable stroke, a larger diameter stroking faster. As used herein the term "stroke" applies to the movement of the cable and the distance traveled to achieve the retracted or non-retracted position.

In a second embodiment, the one or more control cables are each looped onto a rotatable grooved drum coupled to a motor and friction clutch. Rotation of the drum in one direction pulls the control cable to retract the hand grip and rotation in an opposite direction pulls the cable to move the hand grip to a non-retracted position. In the second embodiment, the drive mechanism can employ a pair of motors and drums. Each drum is connected to a single control cable. Rotation of the drums moves the hand grips horizontally apart and an opposing rotation of the drums causing the hand grips to move horizontally together. This second embodiment can be configured with a control cable connected to a motor and grooved drum and rotation of the grooved drum pulls the cable to move the hand grip about a pivot toward an upright or vertical driving position and an oppositely directed rotation of the grooved drum pulls the cable to move the hand grips toward a horizontal or non-driving stowed position. Alternatively, the drive mechanism can employ a pair of motors and drums, each drum controlling a single control cable and wherein the steering wheel has a pair of retractable hand grips pivotally connected at opposite ends of the central hub wherein rotation of the pair of drums in opposite directions causes the cables to pull the hand grip about the pivot to a non-retracted driving position and a reversal of the motors causes the cables to pull the hand grip about the pivot to a stowed non-driving position.

In a third embodiment, the one or more control cables are configured from geared cables that are motor driven.

In a fourth embodiment, the one or more control cables are one or more torsion cable actuators and rotation of the torsion cable actuators by the drive mechanism moves the plurality of retractable grips. In the fourth embodiment, the retractable hand grips are pivotally connected to opposed ends of the central hub and rotation of the torsion cable actuator pivots the retractable hand grips to a horizontal driving position and an opposite rotation of the torsion cable moves the hand grips to a horizontally folded, stowed non-driving position. In an alternative fourth embodiment, the retractable hand grips are pivotally connected at opposite ends of the central hub and actuation in one direction of the torsion cable actuator rotates the cable causing the retractable hand grips to move vertically upright about the pivot to a driving position and an opposite rotation downwards pivots the hand grips to a lowered, stowed non-driving position.

In a fifth embodiment, the torsion cable is combined with a screw and nut for linear movement of the hand grips to replicate the action of the push/pull control cables.

The steering column can similarly be movable inwardly to retract with the steering wheel when in the non-driving position into or adjacent a dash or instrument panel for autonomous vehicles and movable outwardly to position the steering wheel for a manual driving position.

BRIEF DESCRIPTION OF THE DRAWINGS

The following embodiments will be described by way of example and with reference to the accompanying drawings in which.

A second alternative embodiment is shown in FIGS. 3A-6B.

Figure 3A:
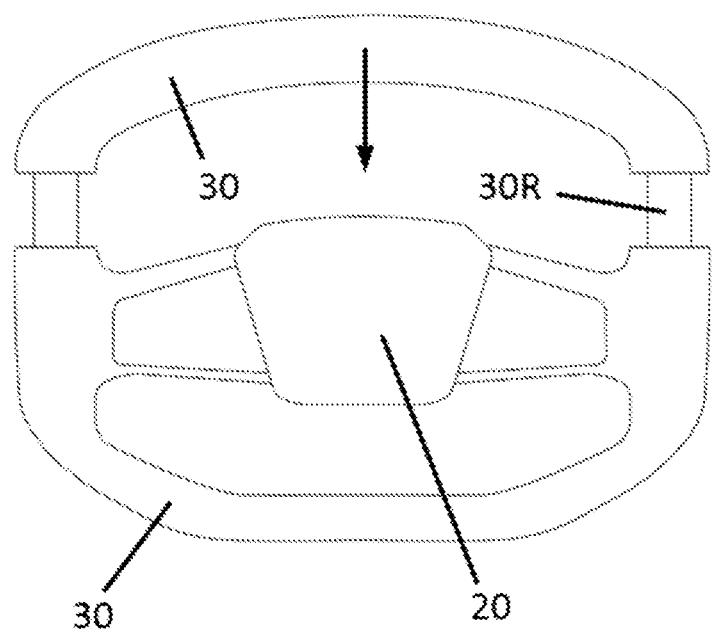
Figure 3B:
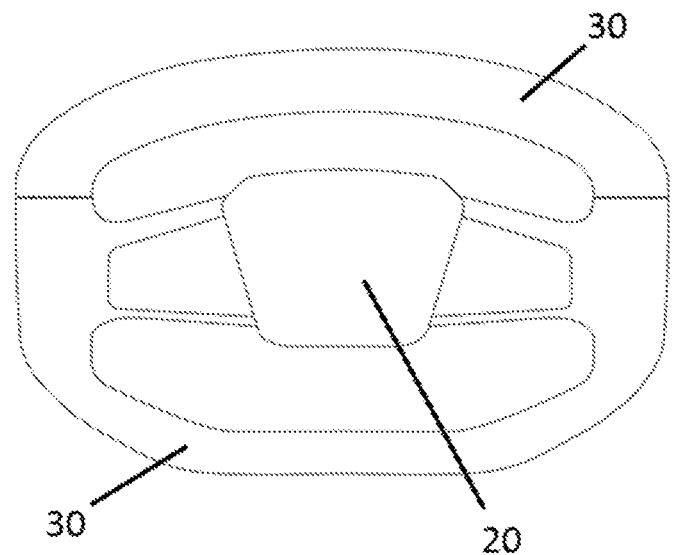

FIG. 3A and FIG. 3B show the 12 o'clock grip retracts vertically.

Figure 3C:
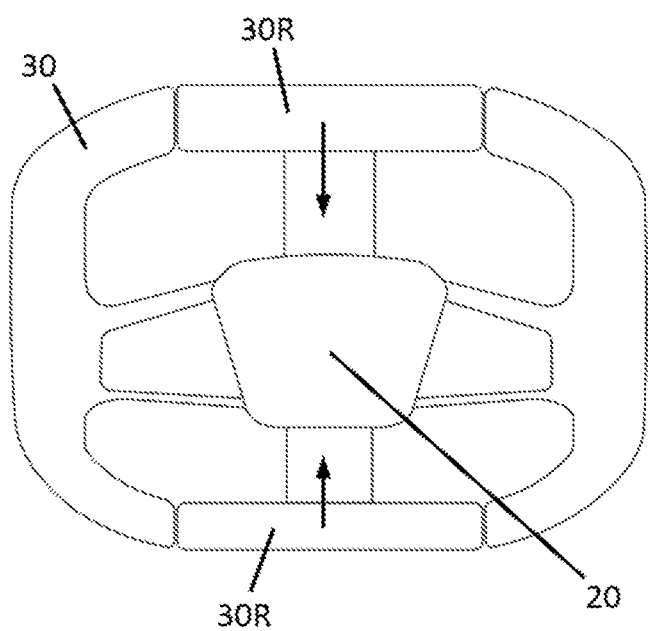
Figure 3D:
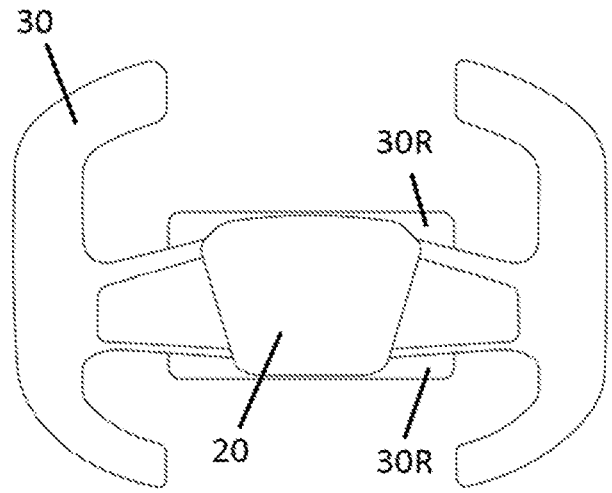

FIG. 3C and FIG. 3D show the 12 and 6 o'clock grips retract.

Figure 3E:
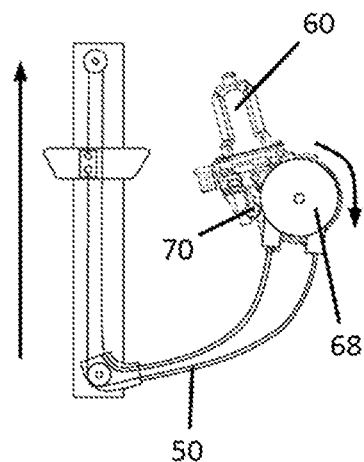

FIG. 3E shows the control cable as a loop wound on a motor driven, rewinding drum with a friction clutch, showing clockwise rotation of the drum.

Figure 3F:
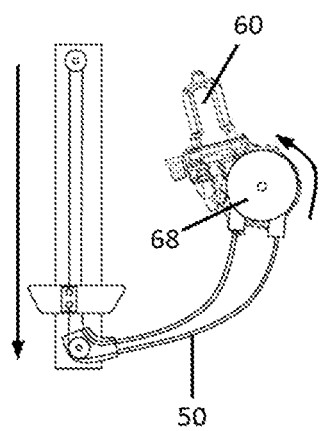

FIG. 3F shows the reverse motor rotation of FIG. 3E.

Figure 4A:
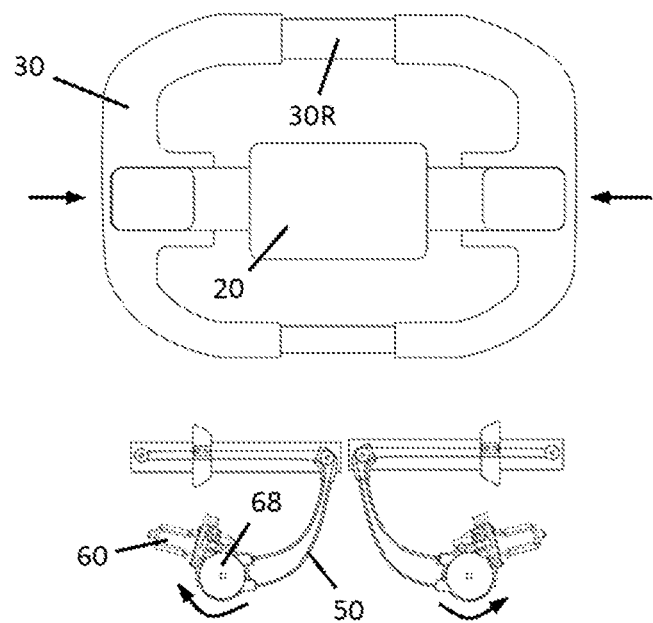

FIG. 4A shows the side grips retracting horizontally with the two drive mechanisms shown below with the motor rotation on each.

Figure 4B:
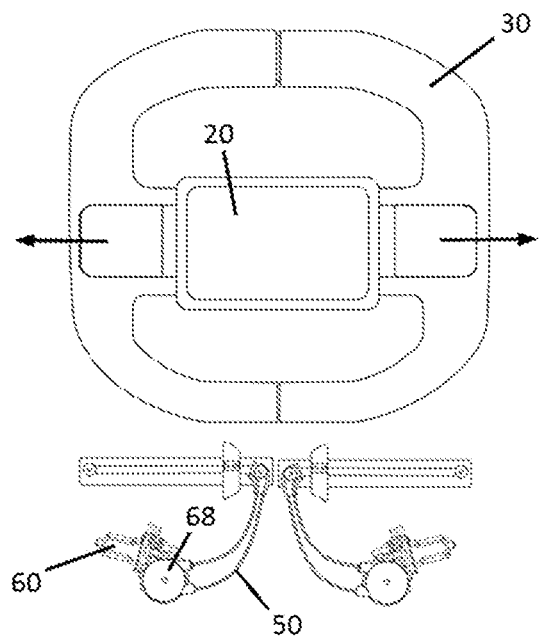

FIG. 4B is a view taken from FIG. 4A with an opposite motor rotation showing the side grips moving apart horizontally from a retracted position.

Figure 5A:
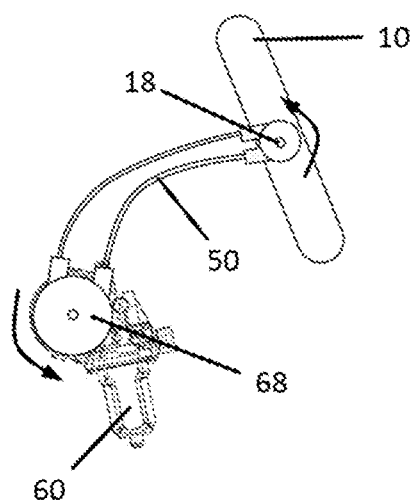

FIG. 5A shows the 12 o'clock portion of the steering wheel grip, according to the second embodiment, being rotated away from the driver.

Figure 5B:
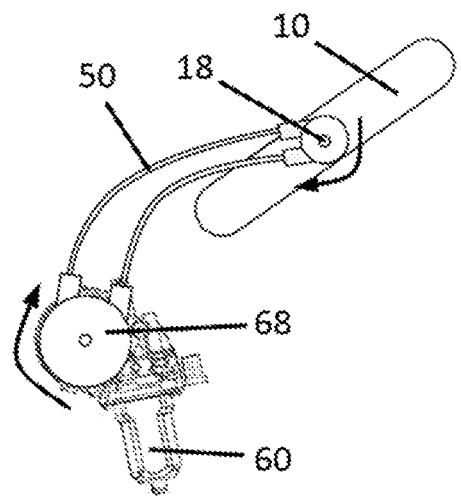

FIG. 5B is the second embodiment showing the opposite movement from FIG. 5A, with the 12 o'clock portion of the steering wheel grip moving towards the driver.

Figure 6A:
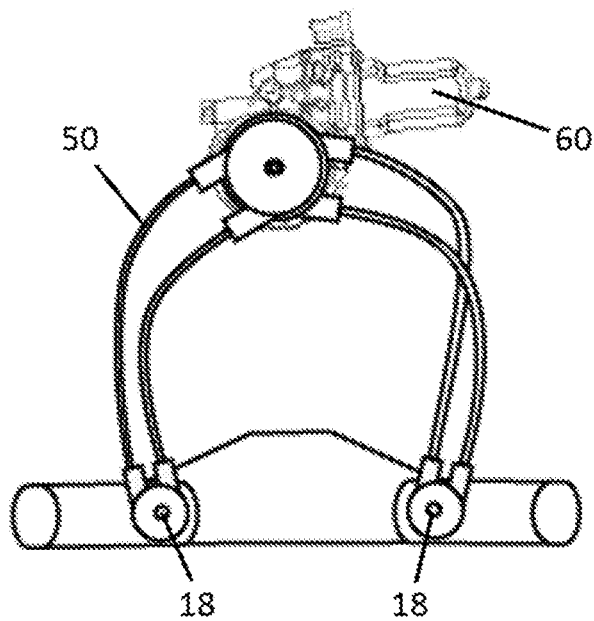

FIG. 6A shows the second embodiment with horizontal folding grips.

Figure 6B:
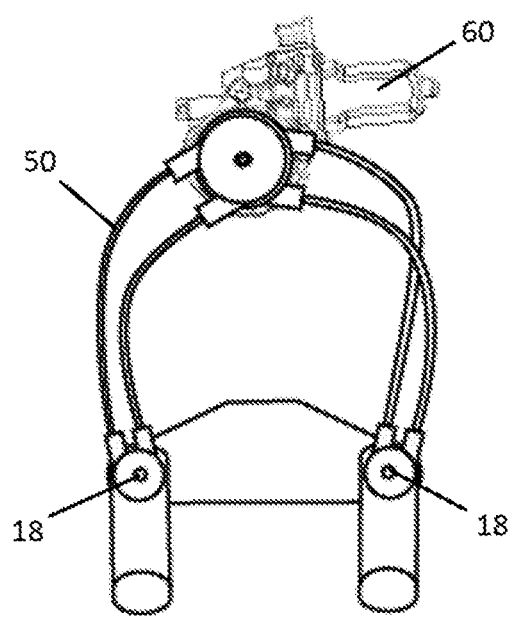

FIG. 6B is the view of the horizontal folding grips being moved oppositely relative to FIG. 6A.

FIGS. 7A-7D show a geared control cable for a third embodiment.

Figure 7A:
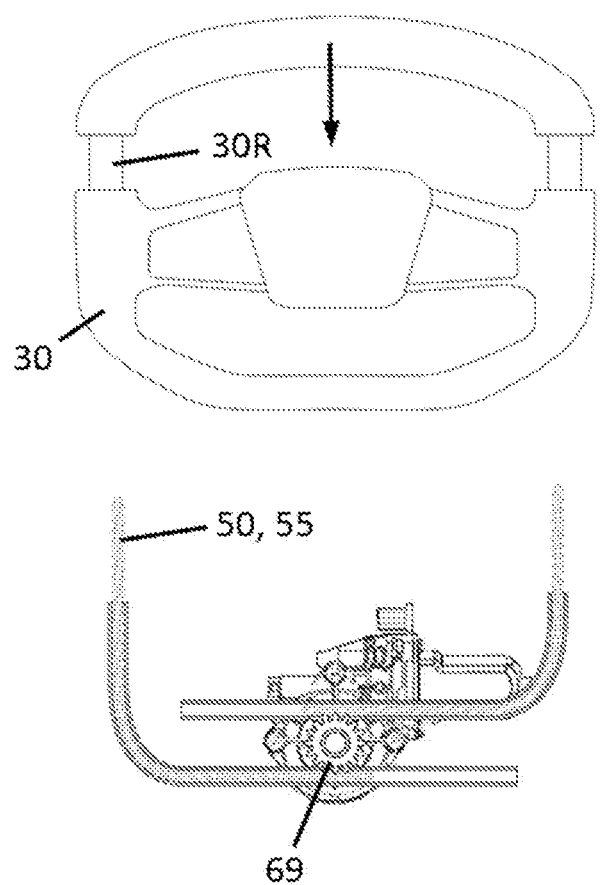

FIG. 7A shows a 12 o'clock grip vertical movement.

Figure 7B:
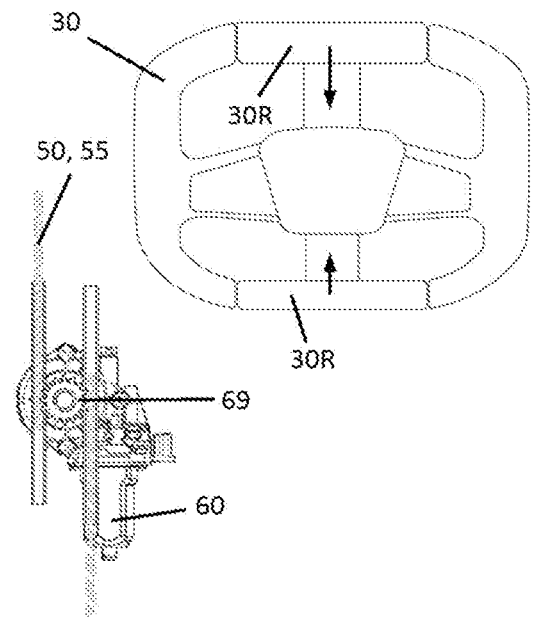
Figure 7C:
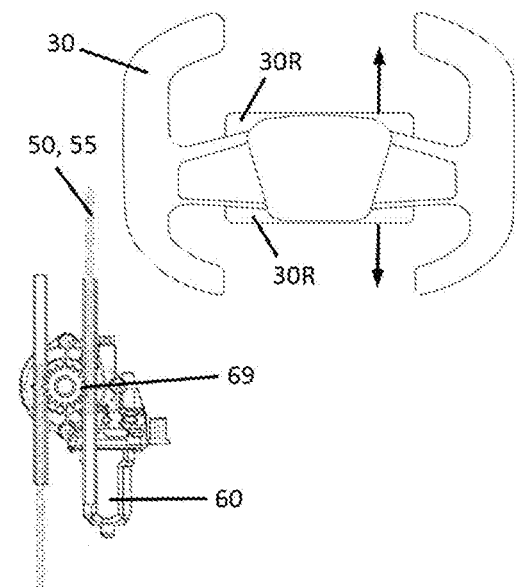

FIG. 7B and FIG. 7C show a 12 and 6 o'clock movement.

Figure 7D:
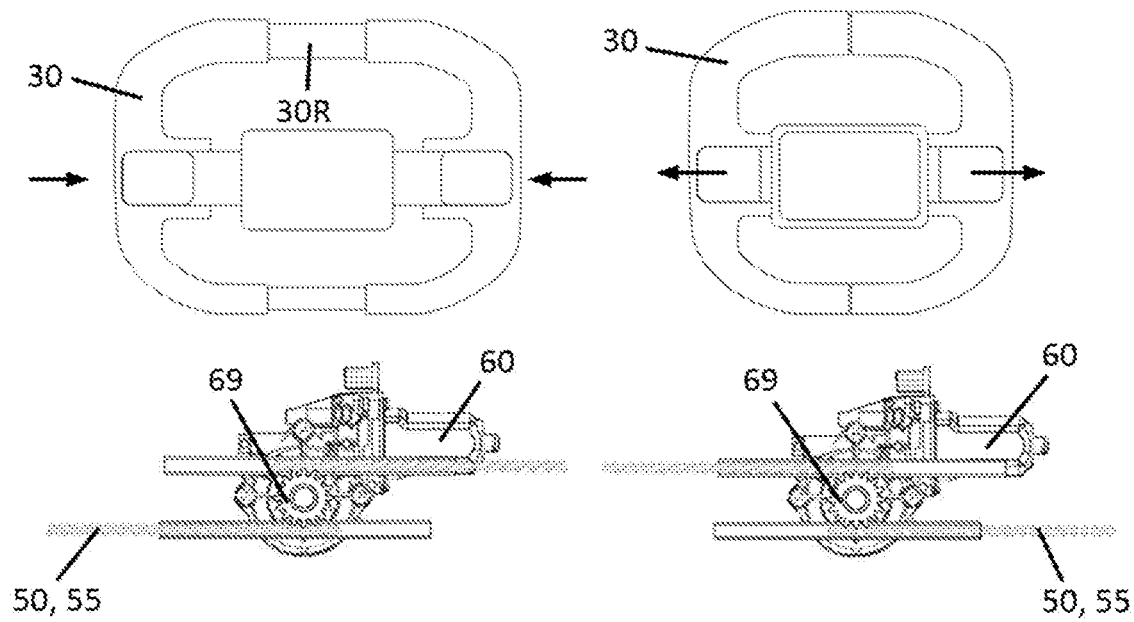

FIG. 7D shows a pair of side grips moved horizontally.

Figure 7E:
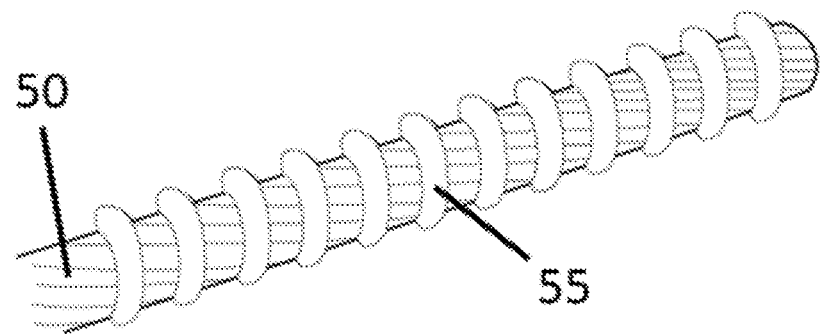

FIG. 7E shows an enlarged view of the geared cable.

Figure 7F:
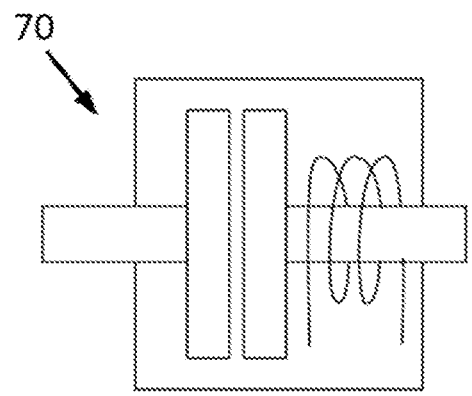

FIG. 7F shows an electric clutch to engage the motor when not connected to the steering wheel hand grips.

FIGS. 8A-8D show a fourth embodiment employing a flexible torsion cable as a control cable.

Figure 8A:
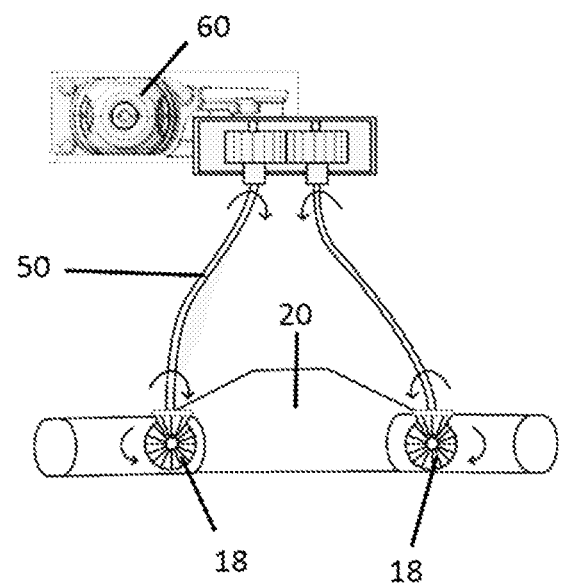
Figure 8B:
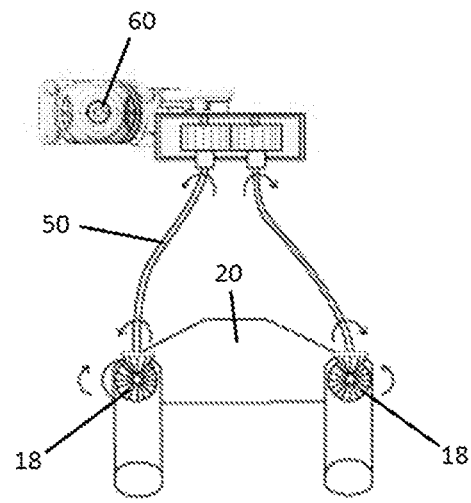

FIG. 8A and FIG. 8B show a horizontal folding grip.

Figure 8C:
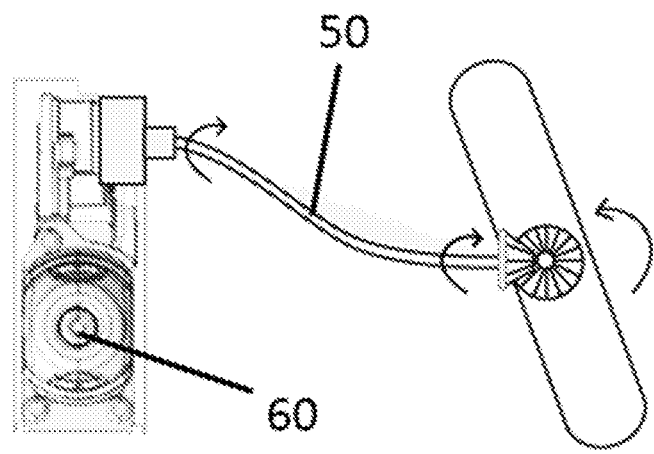
Figure 8D:
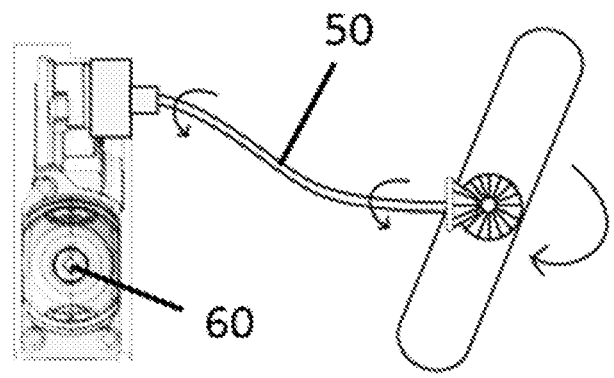

FIG. 8C and FIG. 8D depict a vertical folding grip.

Figure 8E:
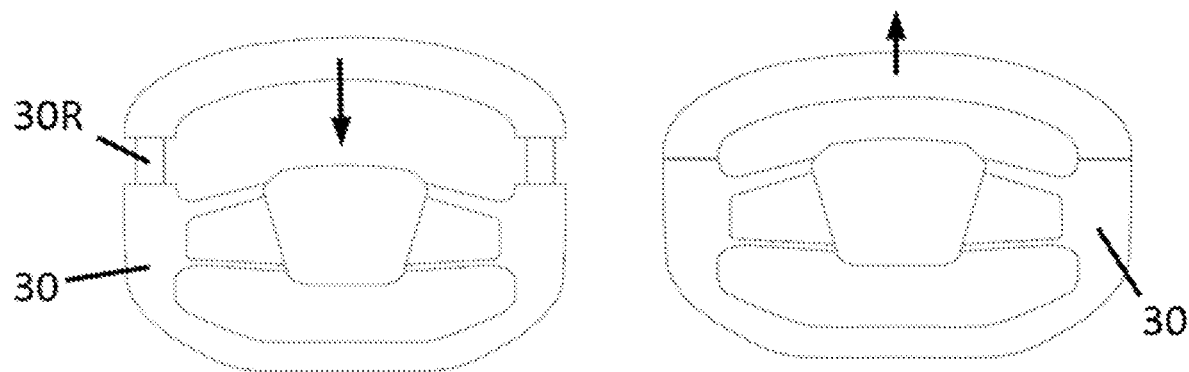
Figure 8F:
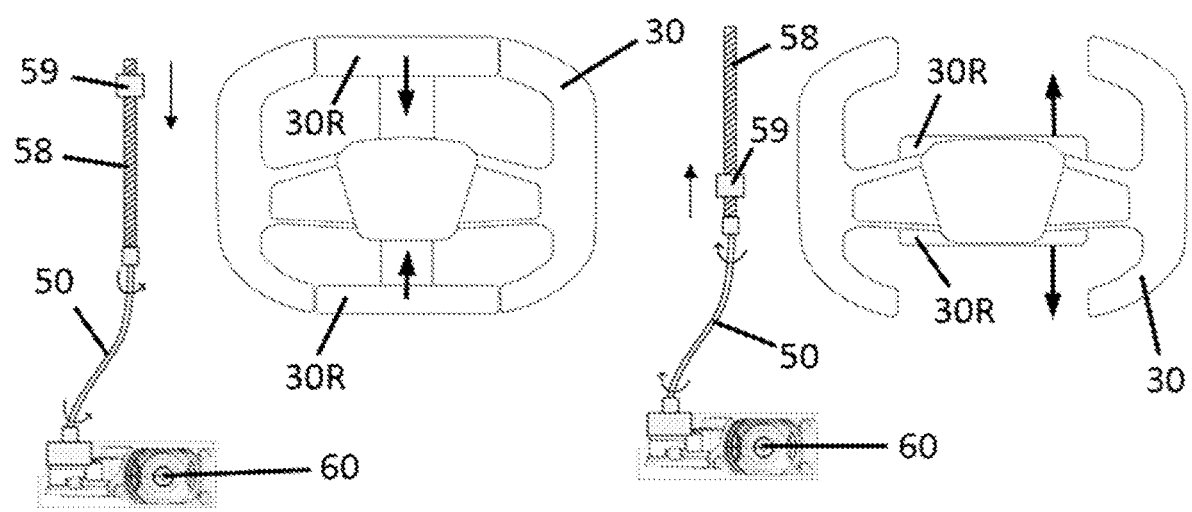
Figure 8G:
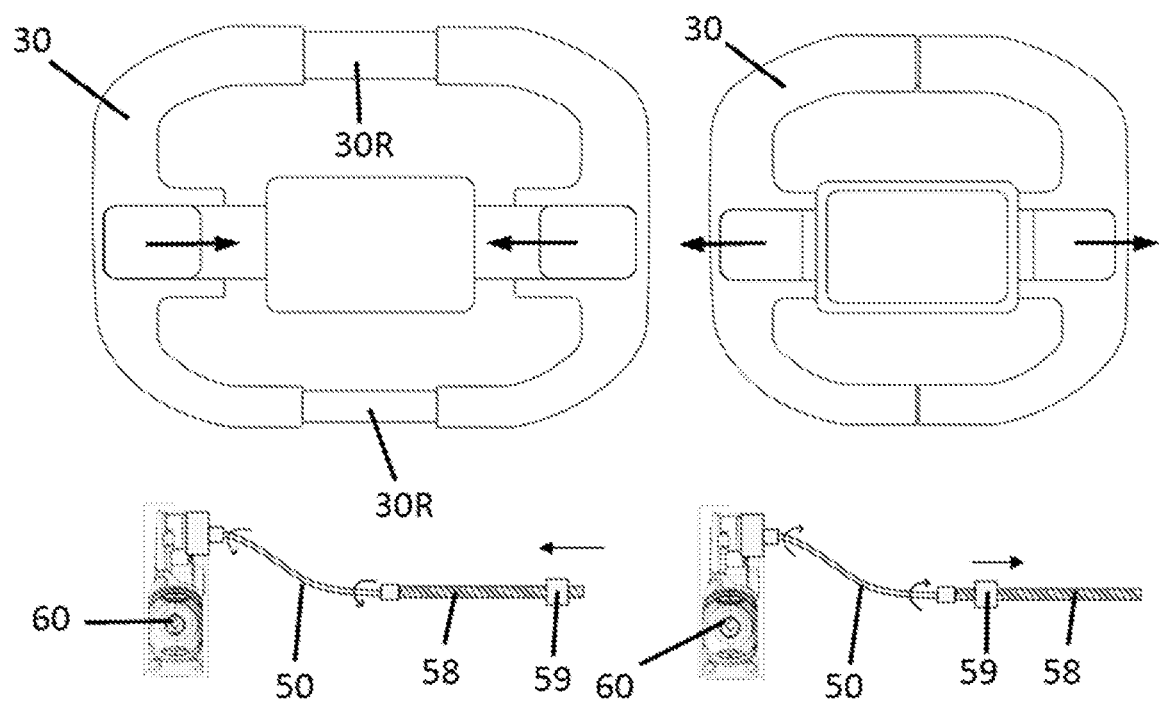

FIG. 8E and FIG. 8F and FIG. 8G show the torsion cable combined with a screw and nut for linear movement.

Figure 9:
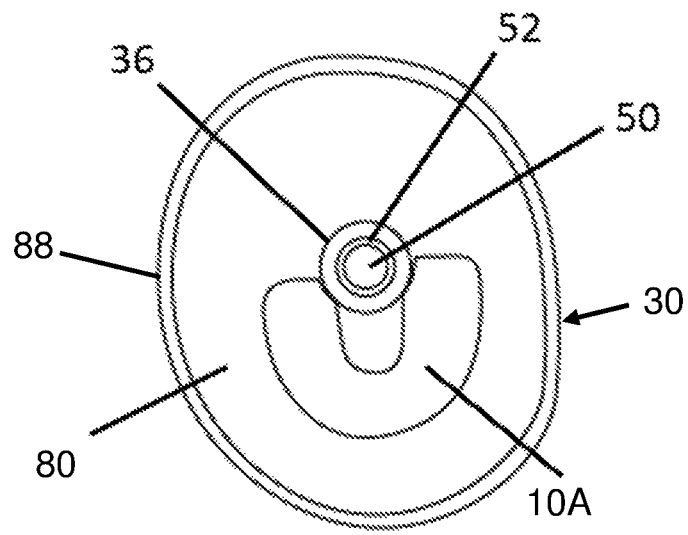

FIG. 9 shows a cut section or cross-sectional view of the one-piece rim of the steering wheel assembly hand grips in which the armature is covered in foam with the outer casing of the cable of the present disclosure locked in the foam.

Figure 10:
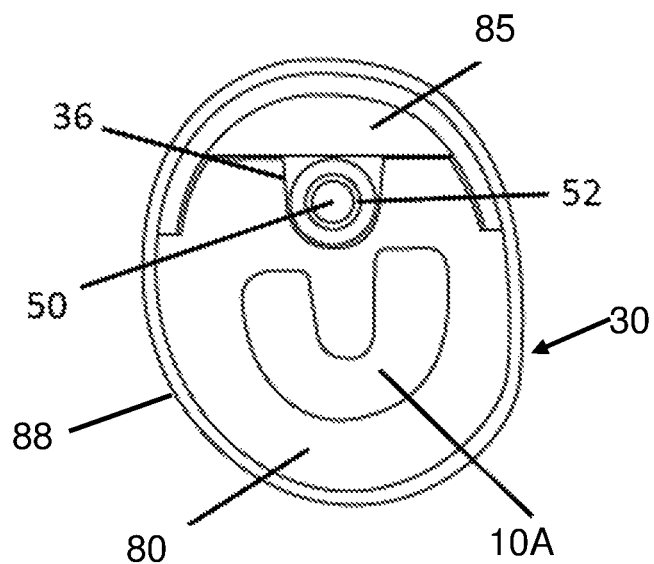

FIG. 10 shows a cut section or cross-sectional view of the rim wherein the steering wheel rim is a two-piece design and the cable inside an outer casing is placed in a cavity and a plastic insert is snapped into the foamed wheel forming the two-piece steering wheel rim.

DETAILED DESCRIPTION

With reference to FIGS. 1A-10, various embodiments of the present disclosure are illustrated. The present disclosure, as illustrated, employs retractable hand grips on a steering wheel assembly. Each of the embodiments employs control cables that allow the hand grips to be moved from a first configuration or position to a second position. In all the embodiments, a motor is connected to the control cables in such a way that either the cable is pushed and pulled or driven by a rack and linear gear system connected to the motor or is rotated torsionally or, alternatively, the motor drives a drum upon which the control cable can wind and unwind moving the hand grips from a retracted to a non-retracted position or vice versa depending on the rotation of the motor.

Due to the similarity of the basic assemblies, common reference numerals will be used for those features that are common to each of the embodiments. For example, the steering wheel assembly 10 will be employed throughout each embodiment, the center hub 20 is also a common feature of all the embodiments. The hand grips 30 are also disclosed as a common feature. However, there may be multiple hand grips used and the hand grips can move in a variety of directions as will be explained in detail as each of the figures is discussed. In some embodiments, some, but not all, of the hand grips forming a steering wheel rim can retract. In others, portions of the hand grips retract.

Figure 1A:
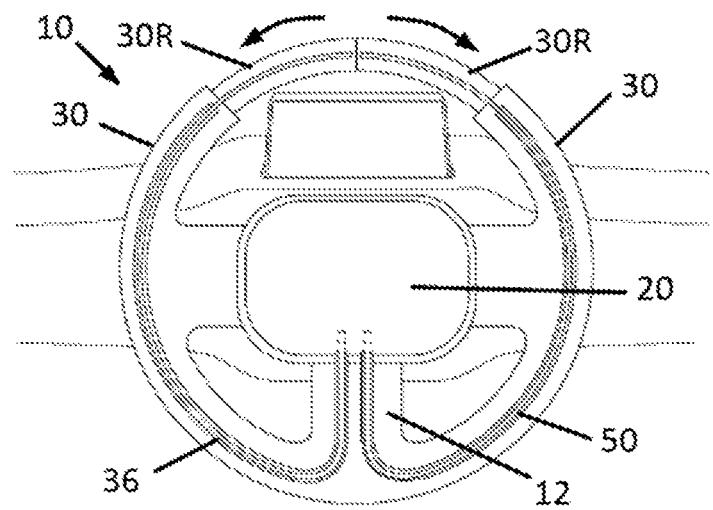
FIG. 1A is a steering wheel assembly of a first embodiment showing the end of the retractable hand grip in the non-retracted 12 o'clock position with arrows illustrating the direction to move when retracted.
Figure 1B:
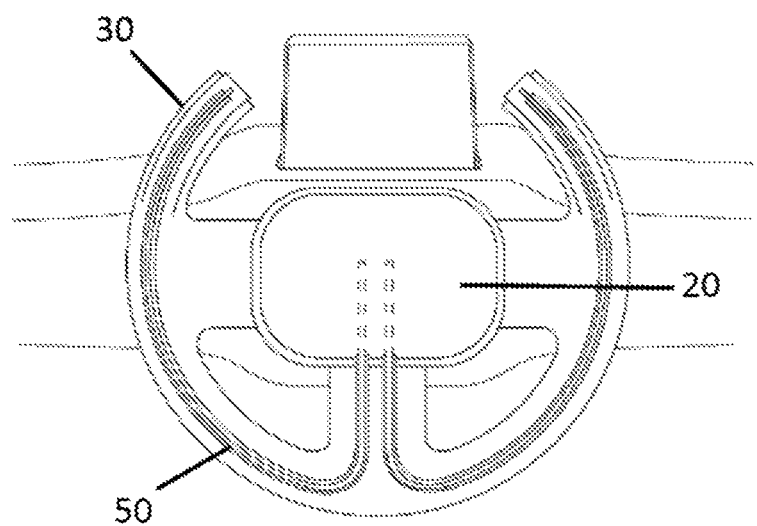
FIG. 1B is the steering wheel of FIG. 1A shown moved to the retracted hand grip position.
Figure 1C:
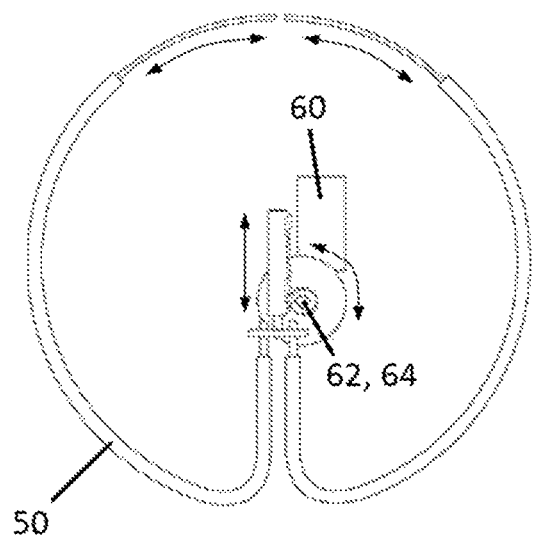
FIG. 1C is a schematic diagram illustrating a linear drive mechanism with a motor and rack and pinion used to push or pull the control cables.
Figure 1D:
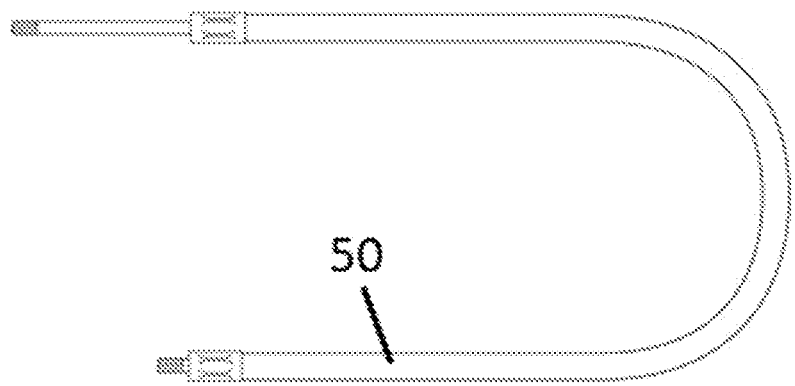
FIG. 1D is an exemplary coil of push/pull cable used to retract the retractable hand grips.
Figure 1E:
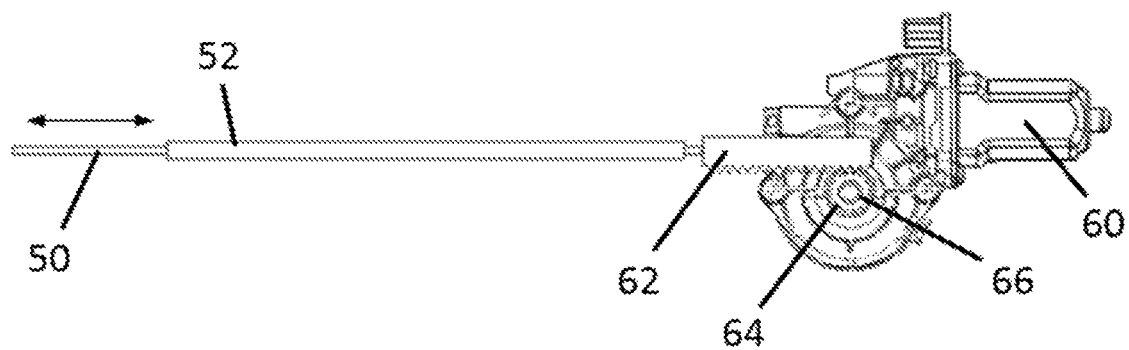
FIG. 1E is a schematic view of the drive mechanism of the first embodiment.

With reference to FIGS. 1A-1E, a first embodiment is illustrated. The steering wheel assembly 10 has a central hub 20 connected to the hand grips 30 and at the 6 o'clock position has a spoke 12 that also attaches the central hub 20 directly to the hand grips 30. As shown in FIG. 1A, internal of the spokes 12 and the hand grips 30 are a pair of cables 50, best illustrated in FIG. 1C. These cables 50 extend internally of the spoke and through an interior cavity 36 of each of the hand grips 30. As shown in FIG. 1A, the steering wheel 10 has the hand grips 30 or rim in a closed position, non-retracted. When a motor 60 is activated, as shown in FIG. 1C, the rotation of the motor 60 pulls on a rack 62 and pinion 64 system that pulls or pushes on the control cables 50 depending on the direction of rotation of the motor 60. As shown in FIG. 1B, when the control cables 50 are pulled back towards the hub 20, the retractable portions 30R of the hand grips 30 are withdrawn back into the hand grips 30 and create an opening at the upper portion or 12 o'clock position of the steering wheel assembly 10. FIG. 1D illustrates the push/pull control cables 50 used to retract the retractable portions 30R of the hand grips 30. FIG. 1E better illustrates how the control cable 50 is moved either inwardly or outwardly and that the control cable 50 has an outer casing 52 and that the control cable 50 is attached to a rack gear 62 and a pinion gear 64 assembly, the pinion gear 64 being affixed to an axle 66 of the electric motor 60 such that when the motor 60 is activated and rotates the axle 66, the pinion gear 64 spins moving the rack gear 62 in one direction or the other depending on the rotation of the axle 66. This causes a push or pull action on the control cable 50 that allows the retractable portion 30R of the hand grips 30 to be moved to a retracted or non-retracted position, as illustrated in FIGS. 1A and 1B.

Figure 2A:
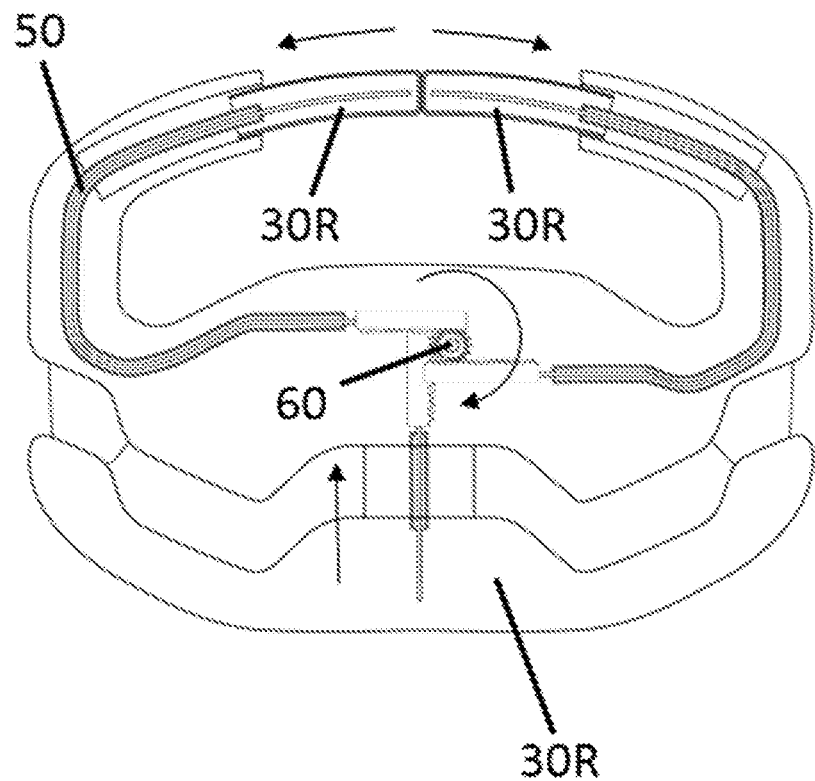
FIG. 2A is another exemplary schematic view of a three cable assembly according to the first embodiment pulling the grips.
Figure 2B:
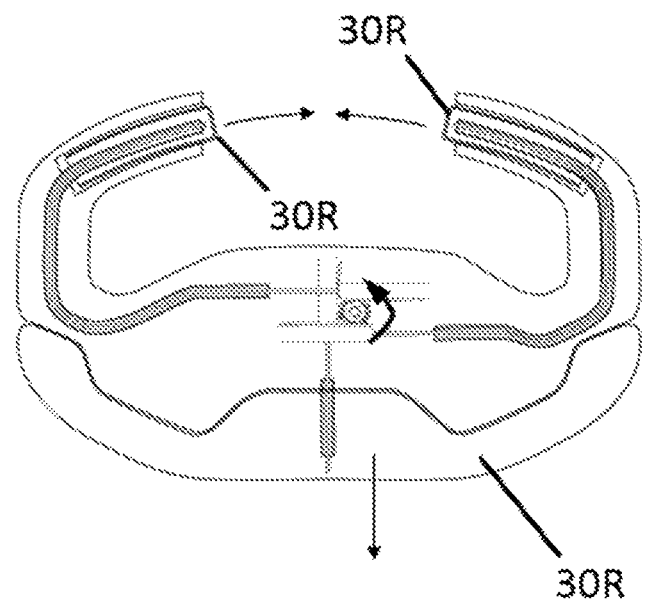
FIG. 2B is a view showing the motor reversed pushing the grips.
Figure 2C:
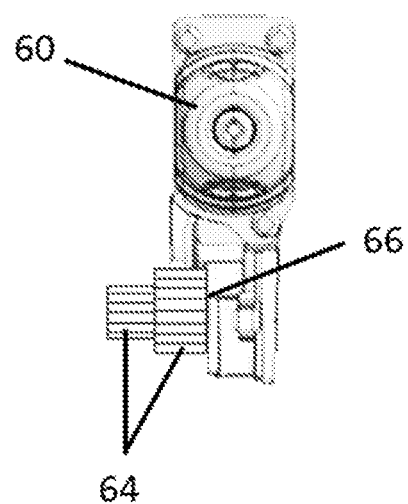
FIG. 2C is an end view of the motor with two pinion gear on the same axis.
Figure 2D:
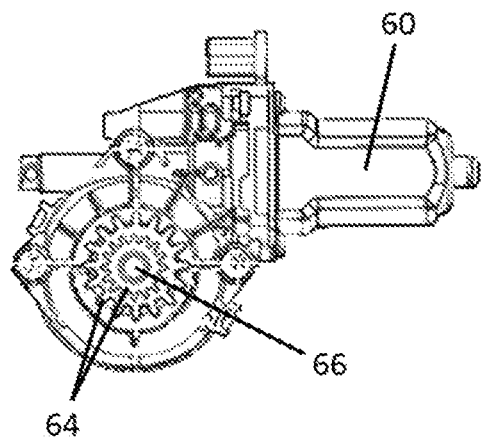
FIG. 2D is a side view taken from FIG. 2C.

An alternative of the first embodiment shown in FIGS. 2A, 2B, which is also a first embodiment, employs three cables 50 which when stroked pull the retractable portions 30R. In this case, the retractable portions 30R of the hand grips 30 are located similarly at the top or 12 o'clock position of the steering wheel assembly 10 and the retractable portions 30R will pull apart in the retracted position and will push together in the non-retracted position depending on the motor 60 rotation. When the motor 60 rotates clockwise, the three cables stroke and pull the retractable portions 30R. In this case, the 6 o'clock position of the steering wheel assembly 10 is shown with a retractable portion 30R pulled inwardly relative to the hub 20. When the motor 60 rotates counter clockwise, the three cables 50 stroke and push the retractable portions 30R back to the non-retracted position. As used herein the term stroke means a movement of the cable 50 in either a forward/outward direction or a rearward/inward direction allowing either a push action or a pull action. As further shown in FIG. 2C, pinion gears 64 can be stacked in pairs on the same axis. As illustrated, two pinion gears 64 are shown of different sizes. By varying the size of the pinion gears 64, the rotation, speed, and movement of the cables 50 being pushed/pulled can be varied. This is further illustrated in a side view in FIG. 2D.

With reference to FIGS. 3A-3F, a second embodiment is illustrated. In this embodiment, the steering wheel assembly 10 has the hand grips 30 configured so that they can move vertically at retractable portions 30R as shown in FIGS. 3A and 3B. In this case, when the control cables 50 are activated, rotation of the motor 60 causes the hand grips 30 to vertically retract compressing toward the central hub 20 as illustrated in FIG. 3B. When fully non-retracted, the 12 o'clock hand grip 30 can extend vertically as shown in FIG. 3A. Additionally, the retractable portions 30R when in a non-retracted position can slide relative to the central hub 20 sliding inwardly as shown in FIGS. 3C and 3D. In this embodiment, the drive motor 60 and the control cables 50 are attached to a rewinding drum 68 with an electric friction clutch 70 as illustrated in FIG. 3E. The motor, when rewinding the drum 68 in one direction, will pull or push the steering wheel assembly 10 to either a retracted or non-retracted position. In this embodiment, as illustrated in FIGS. 3E and 3F, the rotation of the motor 60 establishes the direction in which the cables 50 will be pulled.

With reference to FIG. 4A, side hand grips 30 can be alternatively configured so the hand grips 30 can expand horizontally, either retracting inwardly toward the central hub 20 or extending outwardly relative to the central hub 20 as illustrated. When achieving this motion, a pair of control cables 50 are used as shown in FIGS. 4A and 4B. The rotation of the motors 60 and drums 68 controls the direction the retractable portions 30R will be moved in retracted or non-retracted positions.

In another alternative embodiment illustrated in figures SA, SB, the steering wheel assembly 10 can employ vertical folding grips. In this case the drum 68 will rewind the control cable 50 in such a fashion that the steering wheel assembly 10 will have the hand grips rotated in a vertical position. This is considered a driving position. In an alternative retracted position, the motor 60 and drum 68 will drive the hand grips in such a fashion that they will pivot about a pivot pin 18 as illustrated and lay virtually flat in a position that will allow the steering wheel assembly 10 to be compactly stowed. This occurs when the entire steering column is retracted away from the driver who is no longer in a position to have his hands on the steering wheel assembly 10. This is particularly useful in autonomous vehicles where there is no need for the driver to actively engage the steering wheel.

FIGS. 6A and 6B show another alternative configuration wherein the steering wheel assembly 10 has the hand grips pivotally mounted at pivots 18 to the central hub 20 in such a way that they can horizontally fold. FIG. 6A shows the steering wheel in a position where the hand grips 30 are spaced apart and the rotation of the motors 60 on each side allows the hand grips 30 to be in a position for driving. Alternatively, as shown in FIG. 6B when the motors 60 are rotated in the opposite direction each of the hand grips 30 can be folded such that they approach each other about the pivot points greatly compacting the size of the steering wheel assembly 10.

With reference to FIGS. 7A-7D, a geared control cable 50 is used for a third embodiment. In this embodiment, the cable 50 has external helical windings 55 around the external surface of the cable 50 that is connected to a gear that upon rotation will push or pull the cables 50. As shown in FIG. 7A, the vertical retraction of hand grips 30 and retractable portions 30R is illustrated. In FIG. 7B, the 12 and 6 o'clock grips are shown in a non-retracted position. In FIG. 7C, the movement is such that the hand grips 30 are moved in an opposite direction. FIG. 7D illustrates a horizontal movement of the hand grips 30 retractable portions 30R. In that case, a pair of geared cables 50, 55 are used and each motor 60 has a gear 69 that drives the geared cable 50, 55 in such a fashion to either retract or extend the hand grips 30. FIG. 7E illustrates the helically wound outer wire 55 on control cable 50 which is used to drive the geared cable 50, 55. As shown in this embodiment, the motor 60 and the gear 69 are attached and employ a friction electromagnetic clutch 70 that when engaged prevents the hand grips from being moved unless the cable 50 is rotated by the motor 60 and when disengaged the operator can move the hand grips if so desired. While the clutch 70 is illustrated with this third embodiment illustrated in FIG. 7E, it is important to appreciate the clutch 70 can be used with any of the embodiments disclosed herein.

With reference to FIGS. 8A-8D, a fourth embodiment employing a flexible torsion cable as the control cable 50 is illustrated. In this embodiment, a horizontal folding hand grip 30 feature can be provided as shown in FIGS. 8A and 8B wherein a pair of torsion cables 50 are employed. The torsion cables are rotated by motors 60 and the retractable portions 30R can fold about pivots 18 as previously discussed either into a manual driving, non-retracted position or an autonomous-driving, retracted position. With reference to FIG. 8C, similarly, the torsion cable 50 can be provided to vertically move the steering wheel assembly 10 so that the hand grips 30 are in a vertical position as shown in FIG. 8C or can be pivoted downwardly to a folded position for stowing shown in FIG. 8D. When employing the torsion cable 50 as a fifth alternative embodiment, one can employ a screw 58 and nut 59 system to the torsion cable 50. When the screw 58 and nut 59 system is provided a linear movement can be achieved. When this occurs, as shown in FIGS. 8E and 8F, movement of the hand grips 30 can occur vertically and they can be retracted. As shown in FIG. 8G, horizontal movement can be achieved.

FIGS. 9 and 10 show possible methods of making the steering wheel assembly 10 of any of the disclosed embodiments. Both views are cut sections.

FIG. 9 shows a simple one-piece molded design of the hand grips 30 where the outer casing 52 of the cable 50 would be molded into the wheel 10 during the mold process in which the armature 10A is covered in foam 80. The outer casing 52 would then be locked in the foamed wheel 10 and the cable 50 could be fed through the casing 52. This way, the cable 50 has a smooth casing 52 against which to move, rather than risking friction directly with the foam 80 and causing damage.

FIG. 10 shows a two-piece type steering wheel assembly 10 design, where the wheel 10 is partially formed forming au-shaped cavity 36. The cable 50 inside a casing 52 would be placed in the cavity 36 and a plastic insert 85 would be snapped into the foamed wheel forming a two-piece wheel. As shown, the armature 10A of the steering wheel assembly 10 is encased in the foam 80 and the outer surfaces of the foam 80 and the plastic insert 85 are sheathed in a leather or wood or simulated leather or simulated wood outer covering 88.

In all of the embodiments, the ability to move the hand grips 30 by the use of control cables 50 has been effectively demonstrated. The control cables 50 can be configured in a variety of fashions. As shown the hand grips 30 can be provided with a simulated leather covering or can simply be manufactured with a simulated grain appearance, however the internal cavities 36 within the hand grips 30 and the spokes 12, if used, are such that the cables 50 must be pulled internally through the hand grips 30. The hand grips 30 can be filled with polyurethane as conventionally done or can be otherwise lined so that the movement of the cables 50 does not create any noise or unwanted vibrations during the actuation of the motors 60. It is believed that this ability to change the configuration of the hand grips 30 by the use of motorized control cables 50, optionally with or without a clutch 70, will greatly enhance the ability to transform the steering wheel assembly 10 from a rather large and bulky shape on the end of a steering column to one which can be folded, retracted, and transformed in such a fashion that it can be pulled flush to the dash if so desired and put in a stowed position removed from the driver or the person sitting in the driver seat in the case of an autonomous vehicle where the vehicle itself will control the maneuvering. These features greatly enhance the ability of the interior of the passenger compartment to be designed with better display systems, particularly when done in the autonomous mode. Additionally, while the steering wheel assembly 10 is shown mounted to a steering column, it must be appreciated that the entire steering column can be telescoping if so needed in such a fashion that the entire assembly can be drawn away from the passenger.

What is claimed is:

1. A steering wheel assembly comprises: a central hub;
at least one retractable hand grip coupled to the central hub;
one or more control cables disposed internal of the at least one retractable hand grip; a drive mechanism connected to the one or more control cables; and
wherein the drive mechanism when activated can selectively move the one or more control cables to move the at least one retractable grip from a retracted position to a non-retracted position and from the non-retracted position to the retracted position.

2. The steering wheel assembly of claim 1 wherein the one or more control cables comprises up to four control cables.

3. The steering wheel assembly of claim 2 wherein the control cables are configured as push/pull cables connected to the drive mechanism.

4. The steering wheel assembly of claim 3 wherein the push/pull cables are flexible geared cables.

5. The steering wheel assembly of claim 1 wherein the drive mechanism is positioned remotely relative to the steering wheel.

6. The steering wheel assembly of claim 1 wherein the drive mechanism includes a geared linear drive mechanism having a rack gear and pinion gear connected to a drive motor.

7. The steering wheel assembly of claim 6 wherein the linear drive mechanism includes an axle holding one or more of the pinion gears.

8. The steering wheel assembly of claim 7 wherein when the drive motor is activated the axle rotates the pinion gear moving the rack gear and the control cable connected to the rack gear to move the at least one retractable hand grip into a non-retracted or a retracted position.

9. The steering wheel assembly of claim 7 wherein the drive mechanism has three control cables attached and when the drive motor rotates clockwise, the three cables stroke and pull three retractable hand grips to a retracted position.

10. The steering wheel assembly of claim 7 wherein the drive mechanism has three control cables attached and when the motor rotates counter clockwise, the cables stroke and push the three retractable hand grips to a non-retracted position.

11. The steering wheel assembly of claim 7 wherein the drive mechanism drive motor has two pinion gears stacked onto the axle.

12. The steering wheel assembly of claim 7 wherein the size of the pinion gear determines the speed of the cable stroke with a larger diameter stroking faster.

13. The steering wheel assembly of claim 1 wherein the one or more control cables are each looped onto a rotatable grooved drum coupled to a motor and friction clutch, wherein rotation of the drum in one direction pulls the control cable to retract the at least one retractable hand grip and rotation in an opposite direction pulls the cable to move the at least one retractable hand grip to a non-retracted position.

14. The steering wheel assembly of claim 13 wherein the drive mechanism employs a pair of motors and drums and pair of retractable hand grips, each drum connected to a single control cable wherein rotation of the drums moves the retractable hand grips horizontally apart and an opposing rotation of the drums causing the retractable hand grips to move horizontally together.

15. The steering wheel assembly of claim 13 wherein a control cable is connected to a motor and grooved drum and rotation of the grooved drum pulls to cable to move the at least one retractable hand grip about a pivot toward an upright or vertical manual driving position and an oppositely directed rotation of the grooved drum pulls the cable to move the at least one retractable hand grips toward a horizontal or autonomous driving stowed position.

16. The steering wheel assembly of claim 13 wherein the drive mechanism employs a pair of motors and drums, each drum control to a single control cable and wherein the steering wheel has a pair of retractable hand grips pivotally connected at opposite ends of the central hub wherein rotation of the pair of drums in opposite directions causes the cables to pull the hand grips about the pivot to a non-retracted manual driving position and a reversal of the motors causes the cables to pull the hand grips about the pivot to a stowed autonomous driving position.

17. The steering wheel assembly of claim 1 wherein the one or more control cables are one or more torsion cable actuators and rotation of the torsion cable actuation by the drive mechanism moves the at least one retractable grip.

18. The steering wheel assembly of claim 17 wherein the at least one retractable hand grip is pivotally connected to opposed ends of the central hub and rotation of the torsion cable actuator pivots the at least one retractable hand grip to a horizontal, manual driving position and an opposite rotation of the torsion cable moves the hand grips to a horizontal folded stowed autonomous driving position.

19. The steering wheel assembly of claim 17 wherein the at least one retractable hand grip is pivotally connected at opposite ends of the central hub and actuation in one direction of the torsion cable actuator rotates the cable causing the at least one retractable hand grip to move vertically upright about the pivot to a manual driving position and an opposite rotation downwards pivots the at least one retractable hand grip to a lowered stowed autonomous driving position.

20. The steering wheel assembly of claim 1 wherein the hub is connected to a steering column, wherein the steering column is movable inwardly to retract the steering wheel when in the autonomous driving position into or adjacent a dash or instrument panel for autonomous vehicles and movable outwardly to position the steering wheel for a manual driving position.

* * * * *